Patented Sept. 12, 1922.

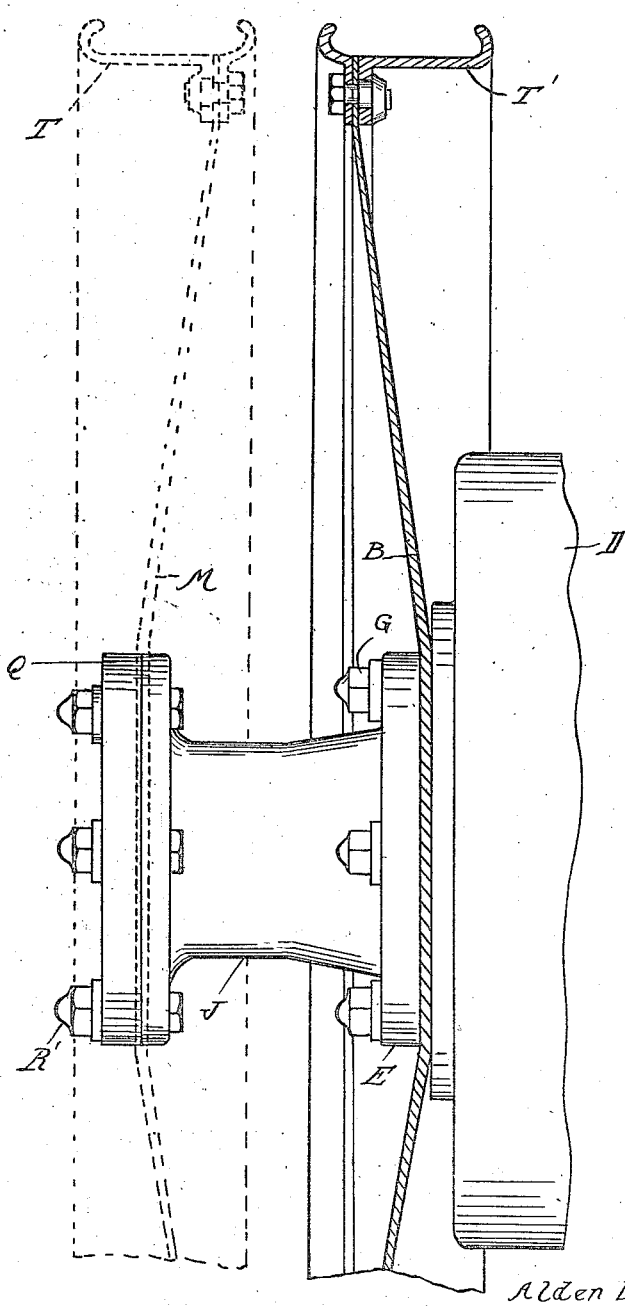

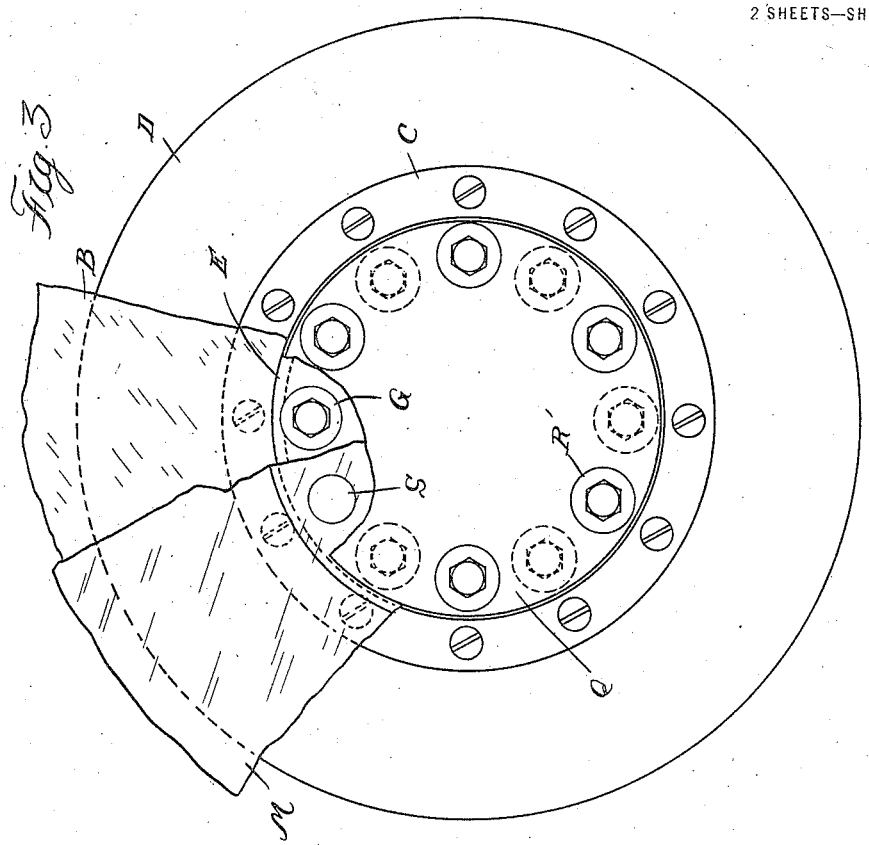
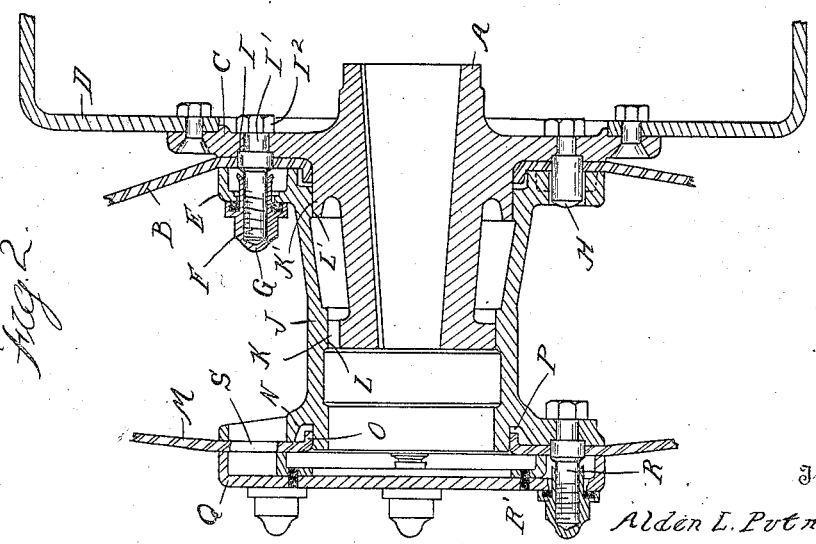

1,428,556

UNITED STATES PATENT OFFICE.

ALDEN L. PUTNAM, OF DETROIT, MICHIGAN, ASSIGNOR, BY MESNE ASSIGNMENTS, TO DETROIT PRESSED STEEL COMPANY, OF WILMINGTON, DELAWARE, A CORPORATION OF DELAWARE.

DUAL VEHICLE WHEEL.

Application filed February 28, 1918. Serial No. 219,563.

*To all whom it may concern:*

Be it known that I, ALDEN L. PUTNAM, a citizen of the United States of America, residing at Detroit, in the county of Wayne and State of Michigan, have invented certain new and useful Improvements in Dual Vehicle Wheels, of which the following is a specification, reference being had therein to the accompanying drawings.

The invention relates to vehicle wheels of that type in which a plurality of wheels are mounted on the same hub and coact in carrying the load. It is the object of the invention,—first, to obtain a construction which is readily convertible from a single to a dual wheel; second, to provide for the independent attachment or detachment of one of the wheels; third, to obtain a simple construction which is easily mounted and dismounted,—as hereinafter set forth.

In the drawings:

Figure 1 is a sectional elevation through the inner member of the dual wheel, showing the outer member thereof in dotted lines;

Figure 2 is a longitudinal section through the hub with both wheels thereon;

Figure 3 is a front elevation of Figure 2.

Heretofore vehicles have been provided with dual wheels, each member of which has its own tire and carries its proportion of the load into the common hub. Provision has also been made for demounting these wheels, but in so doing it is necessary to employ a jack or other means for supporting the load. With the present invention the wheel may be used either as a single or dual construction, and while the load is supported by the single wheel the cooperating wheel member may be mounted or dismounted. This is particularly advantageous where it is desirable to make quick repairs, as with army trucks.

My improvement comprises a hub member A, suitable for the mounting of a disk wheel B, being provided with a flange C against which the center of the disk is clamped and also forming a mounting for the brake-drum D. E is a clamping member for the disk B, which is secured to the flange C by a series of threaded studs F and cooperating nuts G. The studs F are suitably spaced around the flange and have arranged intermediate the same a second series of plain studs or pins H. Both sets of studs are shouldered at I to bear against the flange C and have reduced shanks I' passing through said flange and secured by nuts I².

The clamping plate E is formed integral with a sleeve member J which fits about the hub A and extends outward beyond the same. Bearings K and K' are formed upon the hub, these being preferably of different diameters, and the sleeve member J is provided with corresponding bearing portions L and L' for fitting the bearings K and K'. Thus the sleeve forms an outward extension of the hub and a mounting for the second member of the dual wheel. This second wheel, M, is also of the disk type, and the disks B and M are both preferably similarly dished but arranged to extend in opposite directions. The disk M bears against a flange N extending radially from the outer end of the sleeve J, and to center the disk it is provided with a flange O for engaging an annular recess P on the end of the sleeve. Q is a clamping plate for holding the disk M against the flange N, being secured by threaded studs R similar to the studs F. The studs R are arranged out of alignment with the studs F and preferably in alignment with the studs H, while the flange N is apertured at S in alignment with the studs F to permit of inserting a wrench or other tool through said aperture, to be used in disengaging the nuts G from the studs F.

With the construction as described, when it is desired to use a single wheel the disk B may be clamped in position either by means of the clamping plate E, which is integral with the sleeve J, or by a similar clamping plate omitting the sleeve. To convert this single wheel into a dual wheel it is only necessary to place the disk M in engagement with the flange N at the outer end of the sleeve J and to clamp it in position by the studs R and nuts R'. When thus secured the tired rims T and T' of the two wheel members are arranged adjacent to each other and cooperate in sustaining the load. In case the tire of the inner wheel member is punctured the outer wheel member is capable of sustaining the load until opportunity is afforded for exchanging the tire. On the other hand, if the tire of the outer wheel is punctured this wheel may be removed and replaced without necessity of disengaging the inner wheel or relieving the same from the load.

The plain studs H form a means of transmitting the torque from the flange C not only to the disk B but also to the flange E, to transmit the same to the outer disk. As these studs H are in alignment with the outer clamping studs R and cooperating nuts R', the inner clamping studs which are between the studs H are easily accessible.

What I claim as my invention is:

1. The combination with a wheel hub having a radially extending flange, of a sleeve member for engaging said hub and forming an extension thereof, radially extending flanges at the inner and outer ends of said sleeve member, a disk wheel member secured between the inner flange of said sleeve and the flange on said hub, a disk wheel member seated on the outer flange of said sleeve, a series of cooperating studs and nuts for clamping the inner flange of said sleeve member to the flange of the hub to secure the inner disk wheel, and a series of cooperating studs and nuts for clamping the outer disk wheel member to the outer flange of said sleeve, said inner and outer series of studs being out of alignment with each other and said outer flange being apertured in alignment with the studs of the inner series for engagement of a tool therewith.

2. The combination with a wheel hub having a radially-extending flange, of a sleeve engaging said hub and forming an extension thereof, radial flanges at opposite ends of said sleeve, a disk wheel member intermediate the inner flange of said sleeve and the flange of said hub, a disk wheel member engaging the outer flange of said sleeve, a series of cooperating clamping studs and nuts for securing the inner flange of said sleeve and clamping said inner disk wheel member, an alternate series of studs for transmitting the torque between the flange of said hub, said inner disk wheel member and the inner flange of said sleeve, and a series of cooperating studs and nuts for clamping said outer disk wheel member to the outer flange of said sleeve, being arranged in alignment with the driving studs of the inner series, said outer flange being apertured in alignment with the clamping studs of the inner series to permit of engagement of a tool therewith.

3. The combination with a single wheel, comprising a hub for engaging the axle and an outwardly-extending annular flange thereon, of a dished disk wheel member having its central portion lying adjacent to said flange and its periphery in an outwardly offset plane, a sleeve member engaging said hub having an inner flanged end forming a clamping member for said disk, a dished disk outer wheel member oppositely arranged and having its inner portion adjacent to a flange at the outer end of said sleeve, cooperating studs and nuts for clamping said clamping flange and inner wheel member to the flange of said hub, and cooperating studs and nuts for clamping the outer wheel member to the outer flange of said sleeve.

In testimony whereof I affix my signature.

ALDEN L. PUTNAM.